May 31, 1966 R. C. YOUNG 3,253,687
FLUID OPERATED CLUTCH
Filed Oct. 7, 1964 2 Sheets-Sheet 1
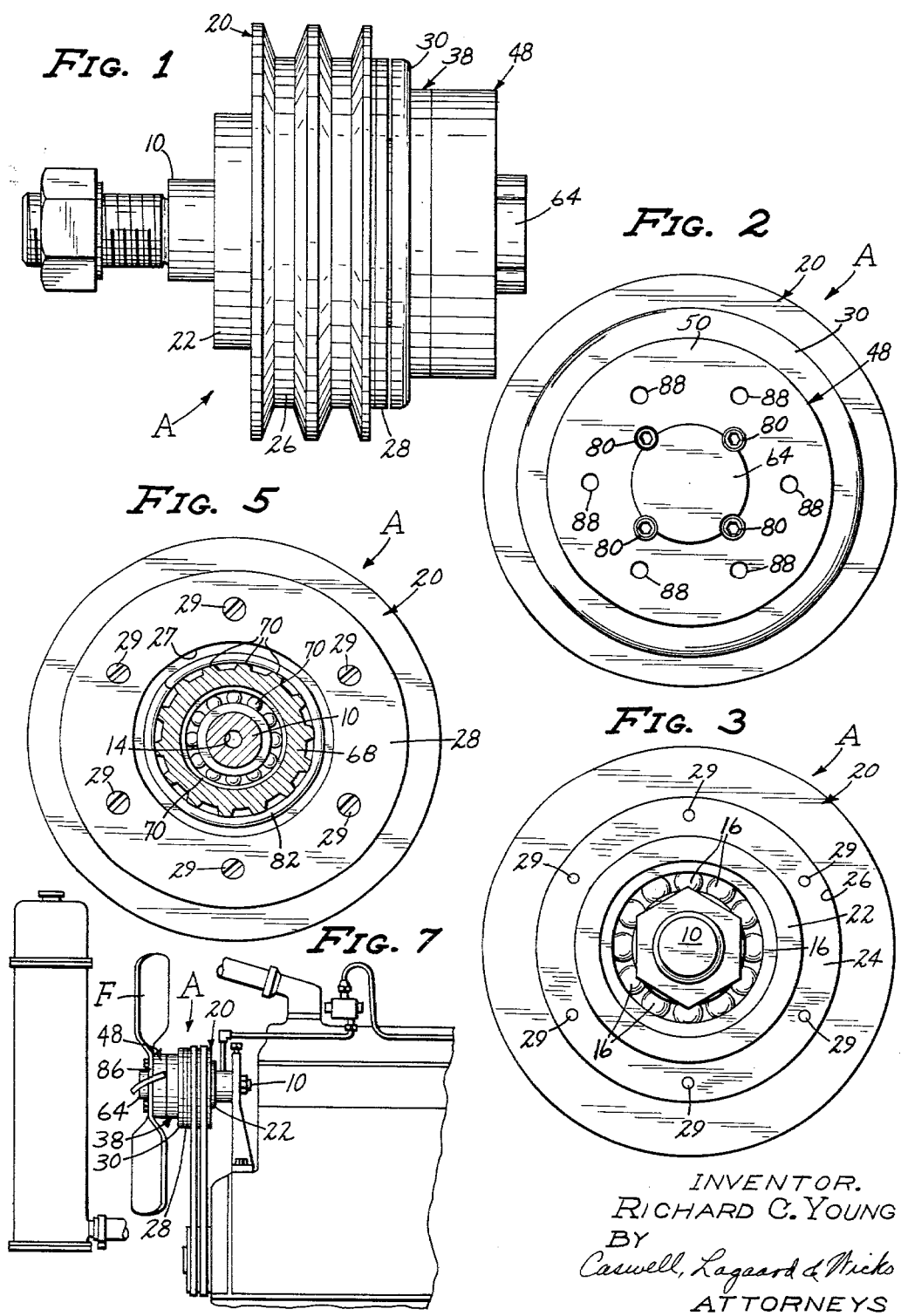
INVENTOR.
RICHARD C. YOUNG
BY
Caswell, Lagaard & Wicks
ATTORNEYS

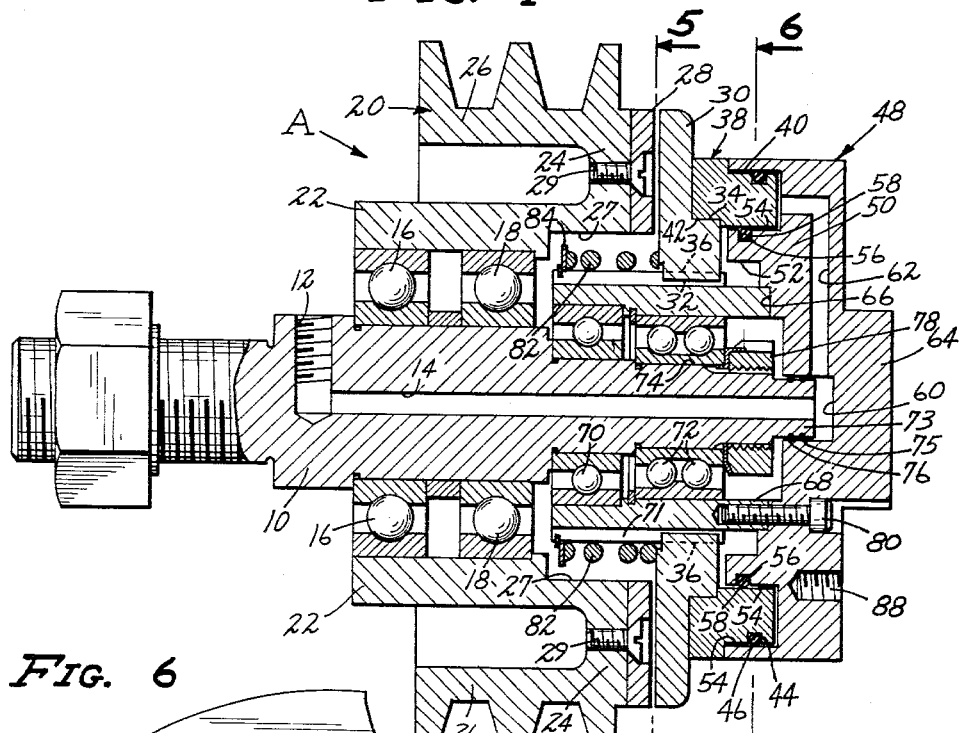
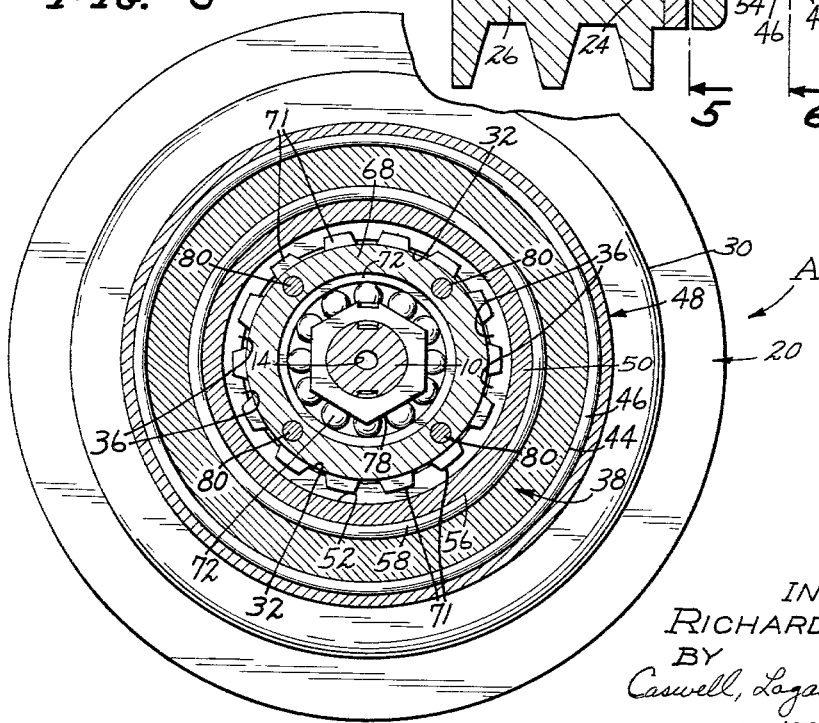

United States Patent Office 3,253,687
Patented May 31, 1966

3,253,687
FLUID OPERATED CLUTCH
Richard C. Young, St. Paul, Minn., assignor to Horton Manufacturing Co., Inc., Minneapolis, Minn.
Filed Oct. 7, 1964, Ser. No. 402,238
4 Claims. (Cl. 192—85)

The invention relates to an improvement in a clutch and more particularly to a clutch for driving a fan for cooling an engine which is operated by a solenoid air valve actuated by a thermostat responsive to engine temperature.

It is an object of the invention to provide a clutch which is self-adjusting by means of a piston and friction disc assembly having splined engagement with a hub for reciprocal movement on the hub, the hub being rotatable on a central fixed shaft. It is another object to provide a clutch which is engaged and in operation for the driving of a fan thereon when the air pressure is "on" but which requires no air pressure when disengaged or "off," the disengagement effected by a spring return. Thus there is no fan drag as in clutches in which air pressure must be maintained to maintain the clutch in a non-operating condition, i.e. with an idle fan. This construction also allows different types of starting which may be accomplished by merely increasing or decreasing air pressure. It is a further object to provide a clutch mounted on a fixed shaft, the shaft having an axial air passageway extending throughout its length which delivers pressure to an annular cylinder, all the components of the clutch being within the longitudinal extent of the air passageway.

It is an additional object to provide a clutch having a driven sheave mounted on a central fixed shaft, the sheave being independent of the friction disc assembly also mounted on the central fixed shaft. It is a still further object to provide a clutch which is longitudinally compact and which has a minimum of moving parts. Compactness is particularly desirable where installation of the clutch is between a cooling fan and an engine block.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:
FIGURE 1 is a side elevational view of the clutch.
FIGURE 2 is a rear end view of the clutch.
FIGURE 3 is a front end view thereof.
FIGURE 4 is a longitudinal sectional view of the clutch.
FIGURE 5 is a transverse sectional view on the clutch on the line 5—5 of FIGURE 4 on a reduced scale.
FIGURE 6 is a transverse sectional view on the line 6—6 of FIGURE 4.
FIGURE 7 is a side elevation of the clutch in a typical installation.

Referring to the drawings in detail, the clutch A includes the fixed shaft 10 having the air inlet hole 12 formed adjacent the front end thereof and normal to the longitudinal axis of the shaft 10, the inlet hole 12 terminating in the internal air passageway 14 extending axially of the shaft and outwardly of the rear end thereof. Mounted on the shaft 10 are a pair of spaced sheave bearings 16 and 18, the inner races of which are press fit on the shaft 10. The outer races of the bearings 16 and 18 mount the driven sheave 20, the races being press fit within the inner annular flange portion 22 of the sheave. The sheave 20 also includes the annular wall portion 24 which connects the outer annular flange portion 26 to the inner annular flange portion 22 in concentric spaced relation. The inner annular flange portion 22 is spaced from the shaft 10 thereby defining an annular chamber 27 concentric with the shaft, and extending within the sheave. The sheave 20 is free to rotate upon the shaft 10.

The numeral 28 designates a circular friction facing which is secured to the face of the annular wall portion 24 of the sheave by means of the bolts 29, the face of the wall 24 being normal to the axis of the shaft 10.

Further provided is the friction disc 30 formed with the axial opening 32 and the annular shoulder portion 34. Extending radially outwardly into the disc 30 at the axial opening 32 are a multiplicity of splines 36.

An annular piston 38 is provided which has formed on a portion of the outer surface thereof the outer annular recess 40 and on the inner surface thereof the inner annular recess 42. The piston 38 is mounted on the disc 30 by press fitting the annular shoulder 34 within the recess 42. The outer surface of the annular recess 40 is formed with an annular groove 44 in which is positioned the O-ring 46.

Further provided is the annular cylinder 48 which includes the circular body portion 50 from which extends the annular flange portion 52. Extending into the annular flange portion 52 is the annular cylinder recess 54 which receives the annular piston 38. The inner annular surface of the cylinder recess 54 is formed with the annular groove 56 in which is positioned the O-ring 58 which makes sealing contact with the piston 58. The O-ring 46 makes sealing contact with the outer wall of the cylinder recess 54. The cylinder body portion 50 is formed with the central axial recess 60 into which the end of the shaft 10 extends and from which leads the radially extending cylinder air passageway 62. The passageway 62 leads to the annular cylinder recess 54. The cylinder body 50 is also formed with the external hub portion 64 and the annular recess 66 into which is press fit the rear end of the hollow hub member 68 thereby mounting the cylinder body on the hub. The hub 68 is rotatably mounted on the shaft 10 by means of the bearing 70 and the bearing 72, the inner races of which are press fit upon a reduced portion 74 of shaft 10 with the outer races thereof press fit within the hollow hub 68.

The hub 68 has formed on the outer surface thereof a multiplicity of splines 70 which engage with the splines 36 of the disc 30 thereby providing reciprocal movement of the disc 30 upon the hub 68. A rotary seal connection is made between inner end portion 73 of the shaft and the axial recess 60 of the cylinder body portion 50 by means of the O-rings 75 and 76. It will be seen that the inner end 72 of the shaft 10 extends into the axial recess 60 of the cylinder body 50 whereby the internal passageway 14 is in communication with the cylinder air passageway 62. The bearings 70 and 72 are held in position on the shaft 10 by means of the nut 78 threadedly engaging the same.

The annular cylinder 48 is connected to the hub 68 by means of the bolts 80. The friction disc 30 is held out of contact with the friction facing 28 of the sheave 20 by means of the coil spring 82 positioned on the splines 70 of hub 68 and bearing against the disc 30 and the stop 84 secured to the hub splines 70, the spring extending within the annular chamber 27.

In a typical installation of the clutch A a fan F is connected to the cylinder body portion 50 by means of bolts secured through the central fan base 86 and into the threaded holes 88 of the body 50.

The invention is not to be understood as restricted to the details set forth since these may be modified within the scope of the appended claims without departing from the spirit and scope of the invention.

Having thus described the invention what is claimed as new and desired to be secured by Letters Patent is:

1. A clutch comprising:
   (a) a fixed shaft having
   (b) a transverse air inlet hole terminating in
   (c) an air passageway extending axially throughout the shaft,
   (d) a sheave rotatably mounted on said shaft and adapted to be driven from a source of power,
   (e) a friction facing secured to said sheave,
   (f) a splined hub rotatably mounted on said shaft,
   (g) a friction disc having a spline formation slidably mounted on said splined hub for engagement with said friction facing,
   (h) spring means normally urging said friction disc from said friction facing,
   (i) an annular piston carried by said friction disc,
   (j) a cylinder body carried by said hub and having an annular cylinder recess into which said annular piston extends,
   (k) said cylinder body having an air passageway formed therein communicating with said axial passageway of said shaft and said annular cylinder recess whereby air pressure introduced into said air passageways causes said piston to move said friction disc into contact with said friction facing of said sheave and thereby rotate said cylinder body.

2. A clutch comprising:
   (a) a fixed shaft having
   (b) an air passageway extending axially therethrough,
   (c) a sheave rotatably mounted on said shaft adapted to be driven from a source of power,
   (d) a friction facing formed on said sheave,
   (e) a hub rotatably mounted on said shaft,
   (f) a friction disc slidably mounted on said hub,
   (g) spring means normally urging said friction disc from said friction facing,
   (h) an annular piston carried by said friction disc,
   (i) a cylinder body carried by said hub and having an annular cylinder recess into which said annular piston extends,
   (j) said cylinder body having an air passageway formed therein communicating with said axial passageway of said shaft and said annular cylinder recess whereby air pressure introduced into said air passageways causes said piston to move said friction disc into contact with said friction facing of said sheave and thereby rotate said cylinder body.

3. A clutch comprising:
   (a) a fixed shaft,
   (b) a transverse air inlet hole terminating in
   (c) an air passageway extending axially throughout the shaft,
   (d) a sheave rotatably mounted on said shaft and adapted to be driven by a source of power,
   (e) a friction facing secured to said sheave,
   (f) said sheave having an inner annular flange portion concentric with said sheave and spaced from said shaft to define an annular chamber,
   (g) a hub having splines formed on the outer surface thereof and rotatably mounted on said shaft extending into said annular chamber,
   (h) a friction disc having a spline formation in slidable engagement with said hub splines for engagement with said friction facing of said sheave,
   (i) a coil spring mounted on said hub and extending within said annular chamber normally urging said friction disc from said friction facing,
   (j) an annular piston carried by said friction disc,
   (k) a cylinder body carried by said hub and having an annular cylinder recess into which said annular piston extends,
   (l) said cylinder body having an air passageway formed radially therein and communicating with said axial passageway of said shaft and said annular cylinder recess whereby air pressure introduced into said air passageways causes said piston to move said friction disc into contact with said friction facing of said sheave and thereby rotate said cylinder body.

4. A clutch comprising:
   (a) a fixed shaft,
   (b) a transverse air inlet hole terminating in
   (c) an air passageway extending axially throughout the shaft,
   (d) a sheave having an inner annular flange portion concentric with said shaft and spaced therefrom to define an annular chamber,
   (e) bearing means positioned between said inner annular flange and said shaft to thereby rotatably mount said sheave on said shaft,
   (f) a friction facing secured to said sheave,
   (g) a hub having splines formed on the outer surface thereof and rotatably mounted on said shaft and extending into said annular chamber,
   (h) a friction disc having a spline formation in slidable engagement with said hub splines for engagement with said friction facing of said sheave,
   (i) a coil spring mounted on said hub and extending within said annular chamber normally urging said friction disc from said friction facing,
   (j) an annular piston carried by said friction disc,
   (k) a cylinder body carried by said hub and having an annular cylinder recess into which said annular piston extends,
   (l) said cylinder body having an air passageway formed radially therein and communicating with said axial passageway of said shaft and said annular cylinder recess whereby air pressure introduced into said air passageways causes said piston to move said friction disc into contact with said friction facing of said sheave and thereby rotate said cylinder body.

References Cited by the Examiner

UNITED STATES PATENTS

| | | | |
|---|---|---|---|
| 2,637,308 | 3/1953 | Dodge | 192 |
| 2,725,185 | 11/1955 | Willcox | 192 |
| 3,202,252 | 8/1965 | Schilling | 192—85 |

DON A. WAITE, *Primary Examiner.*

SAMUEL FEINBERG, *Examiner.*

BENJAMIN W. WYCHE, *Assistant Examiner.*